G. CAVENEY.
DISCHARGE NOZZLE.
APPLICATION FILED JAN. 11, 1917.
1,235,109.
Patented July 31, 1917.
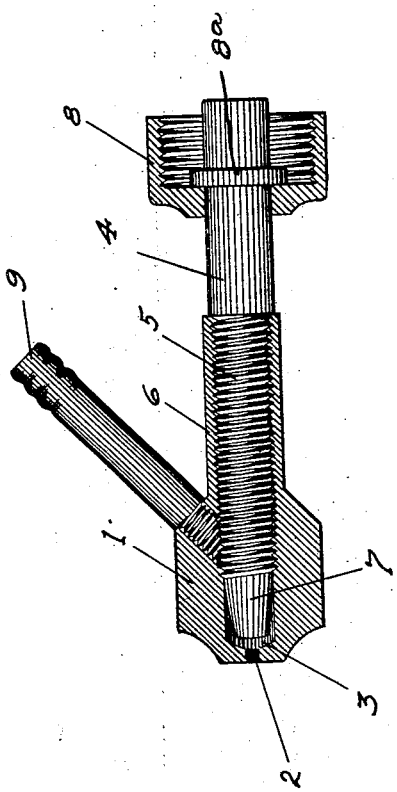
WITNESS
INVENTOR.
George Caveney
BY
ATTORNEY

UNITED STATES PATENT OFFICE.

GEORGE CAVENEY, OF OAKLAND, CALIFORNIA.

DISCHARGE-NOZZLE.

1,235,109.     Specification of Letters Patent.     Patented July 31, 1917.

Application filed January 11, 1917. Serial No. 141,741.

*To all whom it may concern:*

Be it known that I, GEORGE CAVENEY, a citizen of the United States, residing at Oakland, in the county of Alameda, State of California, have invented certain new and useful Improvements in Discharge-Nozzles; and I do declare the following to be a full, clear, and exact description of the same, reference being had to the accompanying drawings, and to the characters of reference marked thereon, which form a part of this application.

This invention relates to improvements in nozzles of all kinds and particularly to a discharge nozzle used in connection with motor vehicles for cleaning the engine of the same of grease and dirt or blowing off the dust from the body, top or other parts. The object of the invention is to produce a nozzle which may be attached to any of the standard air pipes or hoses commonly used around all garages. In addition to this I aim to provide a means for mixing with the air discharged through the nozzle a finely broken up spray of gasolene or other material which will aid in removing the grease and dirt aforesaid.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

The figure is a sectional view of the complete nozzle showing the air and liquid inlets in full.

Referring now more particularly to the characters of reference on the drawings, I first provide the main body of the nozzle 1 which has the outlet opening 2 which terminates at its inner end in an enlarged chamber 3. The air inlet pipe 4 is threaded as at 5 into a threaded sleeve 6 extending forwardly from the main body 1. This air inlet pipe terminates at its forward end in a tapered portion 7 for a purpose as will presently appear. On the pipe 4 is a nut 8 which is of the standard size of nuts used on practically all air pipes or hose lines used in and about garages throughout the country.

The numeral 9 designates a pipe extending obliquely from the body 1 and arranged to communicate with the chamber 3 when the pipe 4 is moved back a sufficient distance to bring the tapered point 7 adjacent this pipe 9.

The pipe 4 is freely turnable within the nut 8, the nut 8 being held in position on the pipe by means of the flange $8^a$. This allows the member 4 to be turned independently of the nut or of the head 1 to advance or retract the threads 5 through the threaded sleeve 6. Thus the communication from the pipe 9 into the chamber 3 may be controlled by the turning of this pipe 4 when the members 8 and 9 are rigidly held in connection with the air hose and liquid supply member respectively.

When it is desired to clean the engine, the nut 8 is screwed on to the outlet valve of an air hose or pipe and the pipe 4 is moved so that the pipe 9 communicates with the chamber 3 just back of the discharge end of the tapered portion 7. A hose leading from a gasolene, distillate, or similar fluid supply is then connected with the pipe 9. The air pressure is then admitted through the pipe 4 and out the tapered outlet 7 and thence through the discharge outlet 2. The passage of this air creates a tendency to vacuum within the chamber 3 which draws in the gasolene, distillate, or other cleaning fluid and breaks the same up into a fine, beautiful spray as it is discharged with the air pressure through the outlet 2. This will thoroughly clean all the refuse that accumulates around the engine. I have found that supplying the gasolene, distillate or other fluid in this manner enables me to get better results with a much less consumption of gasolene, distillate or similar fluid than in any other cleaners now commonly employed for this purpose. When it is desired to merely blow the dust off of the body, top or other parts of the vehicle, the pipe 9 may be closed by advancing the member 4 farther into the sleeve 6, and then the direct air pressure without the fluid may be used with good effect.

From the foregoing description it can be readily seen that I have produced a nozzle for the purpose which can be portable and carried on the person or in the vehicle and quickly and easily attached to any standard air supply means.

From the foregoing description it will also be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A cleaning nozzle comprising a centrally orificed body provided with interior threads for a portion of its length, a lateral pipe communicating with the threaded portion of the interior of such body, another pipe threaded into the threaded portion of the body to control communication through the lateral pipe into the body, a nut on the last named pipe for connecting same to a fluid pressure supply member, the last named pipe being freely turnable within the nut whereby such pipe may be turned to perform its function without the necessity of turning the body or nut.

In testimony whereof I affix my signature.

GEORGE CAVENEY.

Copies of this patent may be obtained for five cents each, by addressing the "Commissioner of Patents, Washington, D. C."